United States Patent [19]

Nagaoka et al.

[11] Patent Number: 4,855,850
[45] Date of Patent: Aug. 8, 1989

[54] DISK APPARATUS WITH DISK ROTATING MEANS

[75] Inventors: Tomoo Nagaoka; Takashi Kimura, both of Tokyo, Japan

[73] Assignee: Copal Company Limited, Tokyo, Japan

[21] Appl. No.: 137,186

[22] Filed: Dec. 23, 1987

[30] Foreign Application Priority Data

Dec. 27, 1986 [JP] Japan .............................. 61-198959[U]
Mar. 30, 1987 [JP] Japan .............................. 62-47522[U]
Mar. 31, 1987 [JP] Japan .............................. 62-46963[U]

[51] Int. Cl.$^4$ .......................................... G11B 17/022
[52] U.S. Cl. .............................. 360/99.12; 360/99.05
[58] Field of Search ...................................... 360/97, 99

[56] References Cited

U.S. PATENT DOCUMENTS 4,672,486 6/1987 Bettini .................................... 360/97
4,697,216 9/1987 Tsukahara ............................... 360/97

FOREIGN PATENT DOCUMENTS

60-166857 11/1985 Japan .
61-16747 1/1986 Japan .

*Primary Examiner*—Robert S. Tupper
*Attorney, Agent, or Firm*—Finnegan, Henderson, Farabow, Garrett & Dunner

[57] ABSTRACT

An apparatus for rotating a magnetic disk supported by a disk hub on its central portion includes a spindle shaft rotated by a driving motor and inserted through a central hole of the disk, a rotating member fixed coaxially to the spindle shaft for corotation therewith, a drive pin arranged off-center on the rotating member and capable of being inserted through an off-center drive hole formed in the magnetic disk, a leaf spring member attached to the underside of the rotating member and including a first leaf spring portion having the drive pin implanted in one end thereof and a second leaf spring portion bent at a right angle from the other end of the first leaf spring portion, a rotational support shaft for rotatably supporting the leaf spring member, at the other end of the first leaf spring portion, on the rotating member about an axis perpendicular to the underside thereof, and a spring contact member fixed off-center to the underside of the rotating member. The second leaf spring portion contacts the spring contact member to apply an urging force for biasing the drive pin into resilient contact with a side edge of the drive hole. The first leaf spring portion applies an urging force for biasing the drive pin resiliently to insert the same into the drive hole.

7 Claims, 10 Drawing Sheets

FIG. IIA

FIG. IIB

FIG. IIC

DISK APPARATUS WITH DISK ROTATING MEANS

BACKGROUND OF THE INVENTION

This invention relates to a disk rotating apparatus for reliably rotating a magnetic disk accommodated in e.g. a floppy disk assembly.

Floppy disk assemblies accommodating a magnetic disk having a diameter of 3.5 inches have recently come into use as the memory media in word processors and personal computers. The floppy disk assembly is inserted in the housing of the word processor or the like, in which state the magnetic disk accommodated therein is driven rotatively by a rotating apparatus. When the disk is being rotated, an operation is performed for writing information onto the magnetic recording surface of the disk or for reading information from the recording surface.

Figure 1A:
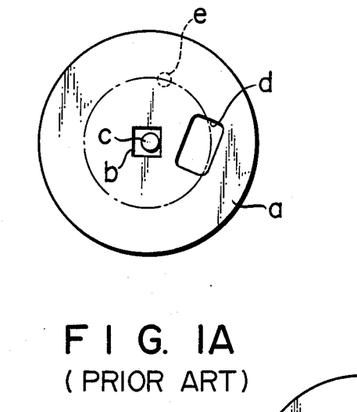
FIGS. 1A through 1C are plan views illustrating a chucking operating sequence according to the prior art.
Figure 1B:
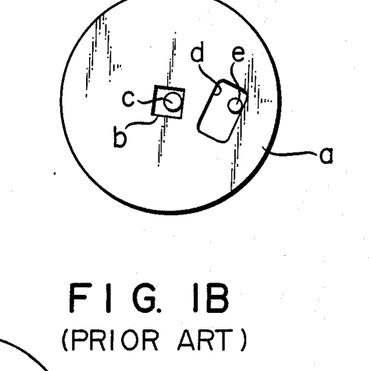

In a disk rotating apparatus according to the prior art, the magnetic disk which has been inserted in the word processor or personal computer housing is chucked as shown in FIG. 1A. The first step of this chucking operation is to attract, by a magnet provided on the top side of a spindle hub, not shown, a disk hub a made of metal and integrally supporting the magnetic disk. The disk hub a is provided with a center hole b, in which a spindle shaft c is inserted, and a drive hole d. As shown in FIG. 1B, a drive pin e, which is supported by a pin holding member upwardly biasing the lower end of the pin, is inserted in the drive hole d.

In this conventional disk rotating apparatus, the spindle shaft c is pressed against a specific corner portion of the center hole b in disk hub a to position the magnetic disk with respect to the spindle shaft c. This is done by utilizing the reaction force of the drive pin e produced when the drive pin e is brought into abutting contact with a corner portion of the drive hole d at rotation of the magnetic disk.

Figure 1C:
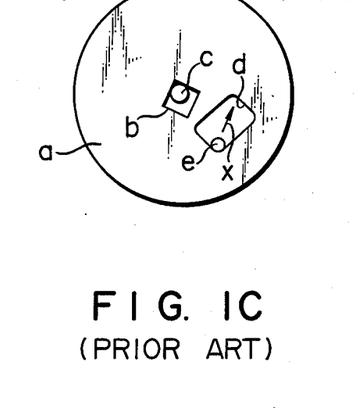

If the drive pin e should happen to shift in the direction indicated by the arrow X in FIG. 1C due to e.g. a fluctuation in the torque of the magnetic disk, the positional relationship between the drive pin e and drive hole d will change. As a result, there will be a decline in the positional accuracy of the spindle shaft c relative to the center hole b, thereby causing an off-track phenomenon. In an attempt to prevent this from occurring, the conventional disk rotating apparatus axially supports the pin holding member, which holds the drive pin e, on the spindle hub so as to be capable of turning back and forth horizontally by a prescribed amount, and includes a torsion coil spring which biases the pin holding member horizontally in a prescribed direction. However, adopting this expedient increases the number of component parts and makes assembly troublesome.

In order to solve the aforementioned problems, a proposed arrangement disclosed in the specification of Japanese Utility Model Application Laid-Open (KOKAI) No. 61-16747 has a spring member f (see FIG. 2) formed integrally to include a horizontal spring member $f_1$ for pressing the drive pin e against the disk hub a of the magnetic disk, and a vertical spring portion $f_2$ for biasing the drive pin e in one direction inside the drive hole d.

Figure 2:
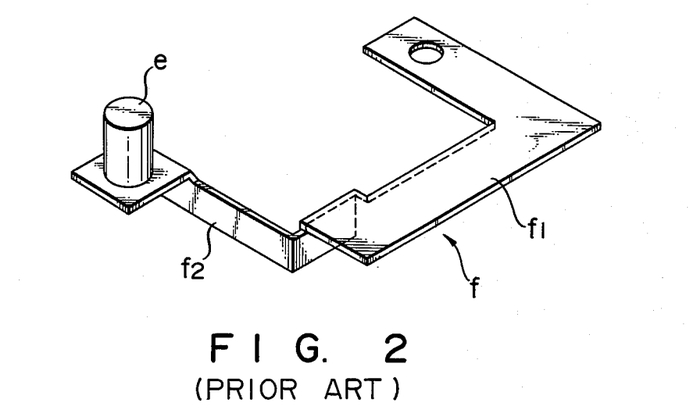
FIG. 2 is a perspective view illustrating the construction of a spring arm according to the prior art.

In this conventional arrangement using the spring member f having the two types of spring portions $f_1$, $f_2$ as integral parts thereof, the drive pin e is positioned in the drive hole d by the horizontal spring portion $f_1$ and is retained at a fixed position within the drive hole d by the vertical spring portion $f_2$. However, as illustrated in FIG. 2, the spring member f is formed to have an L-shaped configuration in which the horizontal spring portion $f_1$ and vertical spring portion $f_2$ intersect each other orthogonally at their end portions. The spring member f is attached to the spindle hub in such a manner that it is fixed at one end (i.e. the distal end of the horizontal spring portion $f_1$) of the L-shaped body. Accordingly, when a pushing force produced at chucking acts upon the drive pin e fixedly secured to the other end (i.e. the distal end of the vertical spring member $f_2$) of the L-shaped body, so-called torsional distortion or twisting occurs in the spring member f. In addition, when a fluctuation in reaction force with respect to the drive pin e occurs when the disk is driven into rotation, the spring member f undergoes compound deformation in both the horizontal and vertical directions, producing torsional distortion or twisting in the spring member f. Thus, with this prior-art expedient, the attitude of the drive pin e cannot be correctly maintained and, hence, the disk cannot be rotated reliably.

Furthermore, the spring member f is fabricated from a leaf spring and, for this reason, the biasing force on the drive pin e is set to be greater than necessary. Since the spring member f is fixed at one end to the spindle hub, moreover, an unnecessary force is applied to the spring member f if, say, the magnetic disk, having been loaded in the disk drive, is forcibly pulled off by hand inadvertently. This unnecessary force can damage or deform the spring member f or lead to other undesirable consequences.

The leaf spring mentioned above is formed from a flat spring member by punching work and therefore has burrs along its edges. If the portions with the burrs contact the underside of the spindle hub, which serves as a rotary body for chucking having the leaf spring attached thereto, the presence of the burrs detracts from the ability of the drive pin e to contact and follow up the edge of the drive hole d. As a result, the magnetic disk is rotated less reliably.

Moreover, since the spring member f is fixed at one end to the spindle hub, undesirable phenomena such as deformation of the spring member f occur when an unnecessary force is applied to the spring member at assembly or when the magnetic disk is loaded in the disk drive.

SUMMARY OF THE INVENTION

An object of the invention is to provide a disk rotating apparatus capable of improving the positioning of a disk, as well as the precision at which the disk is driven, through a simple arrangement.

Another object of the invention is to provide a disk rotating apparatus which, through a simple arrangement, is capable of raising the strength at which a drive pin is supported and, at the same time, is capable of solving the problem of reduced reliability caused by burrs.

A further object of the invention is to provide a disk rotating apparatus which, through a simple arrangement, is capable of improving the positioning of a disk and the precision at which the disk is driven, and which operates in a sure manner.

According to one aspect of the present invention, there is provided a disk rotating apparatus for rotating a magnetic disk supported by a disk hub on its central portion, the disk hub having a central hole coaxial with a central axis thereof and a drive hole eccentric with respect to the central axis, the disk rotating apparatus comprising: a driving motor; a spindle shaft rotated by the driving motor and inserted through the central hole of the magnetic disk; a rotating member fixed to the spindle shaft in coaxial relation therewith and rotated together with the spindle shaft; a drive pin arranged on the rotating member eccentric with respect to the central axis thereof and capable of being inserted through the drive hole of the magnetic disk; a leaf spring member attached to the underside of the rotating member, the leaf spring member including a first leaf spring portion having the drive pin implanted in one end thereof, and a second leaf spring portion bent at a right angle from the other end of the first leaf spring portion; journal means for rotatably supporting the leaf spring member, at the other end of the first leaf spring portion, on the rotating member about an axis perpendicular to the underside of the rotating member; and a spring contact member fixed to the underside of the rotating member eccentric with respect to the central axis thereof; the second leaf spring portion contacting the spring contact member to apply an urging force for biasing the drive pin into resilient contact with a side edge of the drive hole, and the first leaf spring portion applying an urging force for biasing the drive pin resiliently to insert the same into the drive hole.

According to another aspect of the present invention, there is provided a leaf spring member for biasing a drive pin into driving contact with a drive hole of a rotatable disk mounted on a rotatable support member, comprising: a first spring portion for biasing the drive pin in a first direction and having a first end for supporting the drive pin and a second end; a second spring portion for biasing the drive pin in a second direction different from the first direction and having a first end connected to the second end of the first spring portion; and means for mounting the first spring portion and the second spring portion on the rotatable support member to prevent twisting of the first spring portion upon mounting of the disk on the rotatably support member.

In the disk rotating apparatus constructed as set forth above, the leaf spring member is rotatably supported on the rotating member via journal means, the drive pin secured to the leaf spring member is biased toward the rotating member by the first leaf spring portion and is capable of receding at chucking. The desired force for positioning the drive pin and for rotating the drive pin is received by virtue of the second leaf spring portion without a twisting force being produced.

Further, in the disk rotating apparatus constructed as described above, the peripheral portion of the part of the leaf spring member that supports the drive pin is provided with an upstanding projection that extends in a direction away from the rotating member. By virtue of this projection, the periphery of the leaf spring member supporting the drive pin has a generally bracket-shaped cross section. Thus, the geometrical moment of inertia of the cross section of this portion is increased, so that the drive pin is supported with greater strength.

Since the upstanding projection extends in a direction away from the rotating member, moreover, any burrs that might be formed on the peripheral edge portion of the leaf spring member supporting the drive pin will not contact the surface of the rotating member. Wear resistance is thus enhanced and the drive pin will stably contact and follow up the edge of the drive hole.

Furthermore, a rotational support shaft of the journal means for rotatably supporting the leaf spring member is implanted in the rotating member, and the distal end of the rotational support shaft is inserted in a hole of a holding member fixed to the first leaf spring portion of the leaf spring member. Here the holding member is formed to have a prescribed thickness. As a result, a prescribed surface of sliding contact is formed between the rotational support shaft means and the hole. The leaf spring member therefore will not twist and is maintained in a state in which it is capable of rotating in excellent fashion.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 10A and 10B top and front views, respectively, illustrating the construction of a spring arm in a first modification of the second embodiment.

DESCRIPTION OF THE PREFERRED EMBODIMENTS

The construction of a first embodiment of a disk rotating apparatus according to the invention will now be described in detail with reference to FIGS. 3A through 6C of the accompanying drawings.

A disk rotating apparatus 10 according to a first embodiment of the invention is for rotatively driving a magnetic disk 14 freely rotatably accommodated as a storage medium in a floppy disk assembly 12 (see FIG. 4) loaded in a word processor (not shown) by being inserted into the housing of the word processor. The word processor writes information onto the magnetic disk 14 or reads information from the magnetic disk 14 through a magnetic head, not shown, while the magnetic disk 14 is being rotated.

Figure 3A:
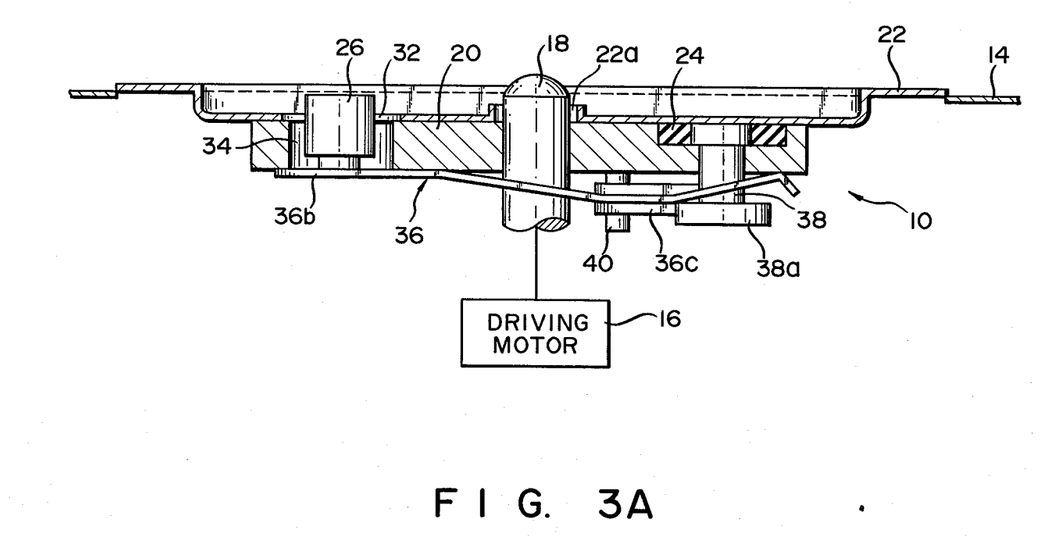
FIG. 3A is a sectional view illustrating the principal components of a first embodiment of a disk rotating apparatus according to the present invention.

The disk rotating apparatus 10, as shown in FIG. 3A depicting the principal components thereof, has a spindle shaft 18 rotatively driven by a driving motor 16. A rotating disk member 20 is fixed to the upper portion of the spindle shaft 18 in coaxial relation therewith, with the upper end of the spindle shaft 18 projecting above the rotating disk member. A generally ring-shaped rubber magnet 24 is arranged, in coaxial relation with respect to the rotational axis of the spindle shaft 18, on one side of the rotating disk member 20, namely on the side opposing a metal disk hub 22 provided on the central portion of the magnetic disk 14 of the floppy disk assembly 12. The rubber magnet 24 is for attracting the disk hub 22 of the magnetic disk 14, which has been loaded in the rotating apparatus 10, toward the rotating disk member 20 by means of magnetic force, and for rotating the magnetic disk 14, while the latter is in the attracted state, in cooperation with a drive pin 26, described below, in response to rotation of the spindle shaft 18.

Figure 4:
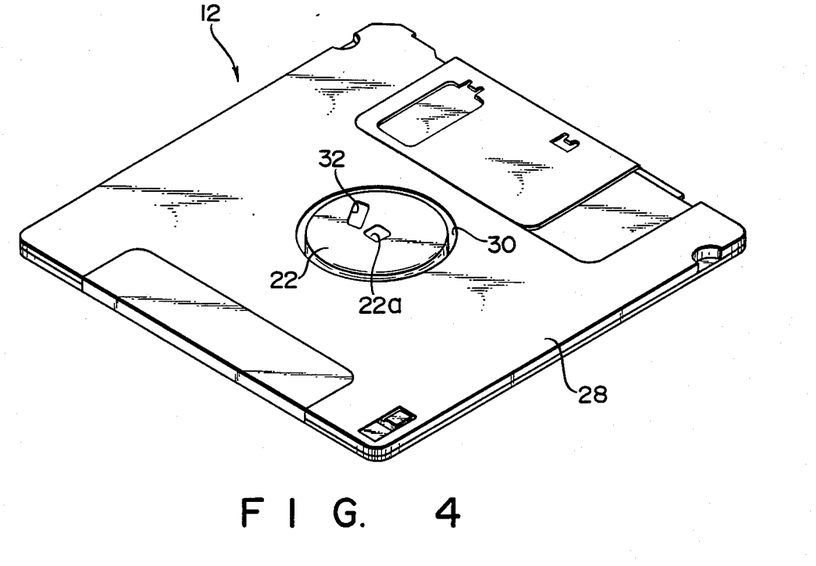
FIG. 4 is a perspective view illustrating a magnetic disk assembly, as seen from below, in a state where the magnetic disk is accommodated in a jacket.

As shown in FIG. 4, the floppy disk assembly 12 is constituted by a thin, hollow hard case (jacket) 28 made of plastic, and the magnetic disk 14 freely rotatably accommodated within the hard case 28. The underside of the disk hub 22 fixed to the central portion of the magnetic disk 14 is exposed through a hole 30 formed at the central portion of the hard case 28 in the underside thereof. Formed at the rotational center of the disk hub 22 is a generally square central hole 22a through which the upper end of the spindle shaft 18 is loosely passed when the floppy disk assembly 12 has been loaded in the rotating apparatus 10. A drive hole 32 through which the drive pin 26 (described below) is passed is formed in the disk hub 22 at a position eccentric with respect to the rotational axis of the hub.

The rotating disk member 20 is formed to include an oblong hole 34 at a position which will be opposed by the drive hole 32, which is formed in the disk hub 22, when the magnetic disk 14 has been loaded. In other words, the drive hole 32 and the oblong hole 34 are both formed so as to be situated on a circular arc having the same radius with respect to the rotational center of the spindle shaft 18. The arrangement is such that when these two holes are at identical angular positions, the holes are in communication vertically. The oblong hole 34 is formed into an arcuate configuration the central axis of which is the same as the center of rotation of a spring arm 36, described below.

Figure 5:
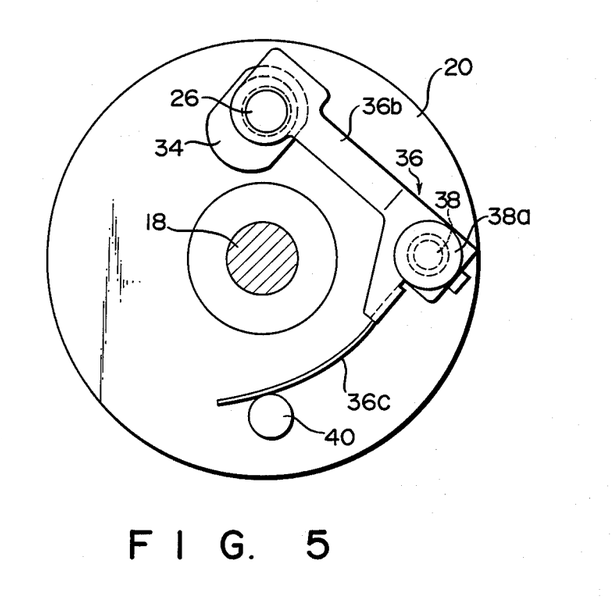
FIG. 5 is a bottom view illustrating a spring arm in a state mounted on the underside of a rotating disk member.
Figure 6A:
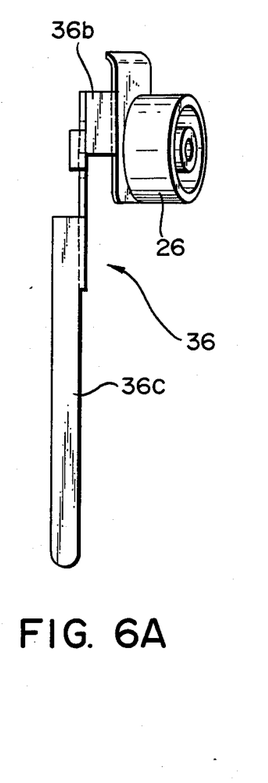
FIGS. 6A, 6B and 6C are side, top and front views, respectively, illustrating the construction of the spring arm.
Figure 6B:
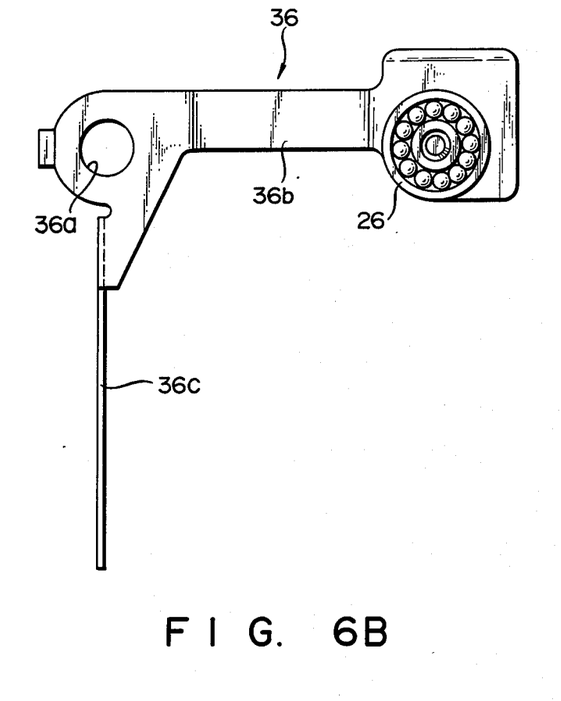
Figure 6C:
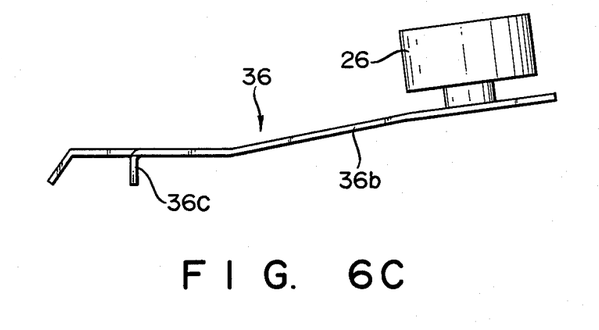
Figure 7:
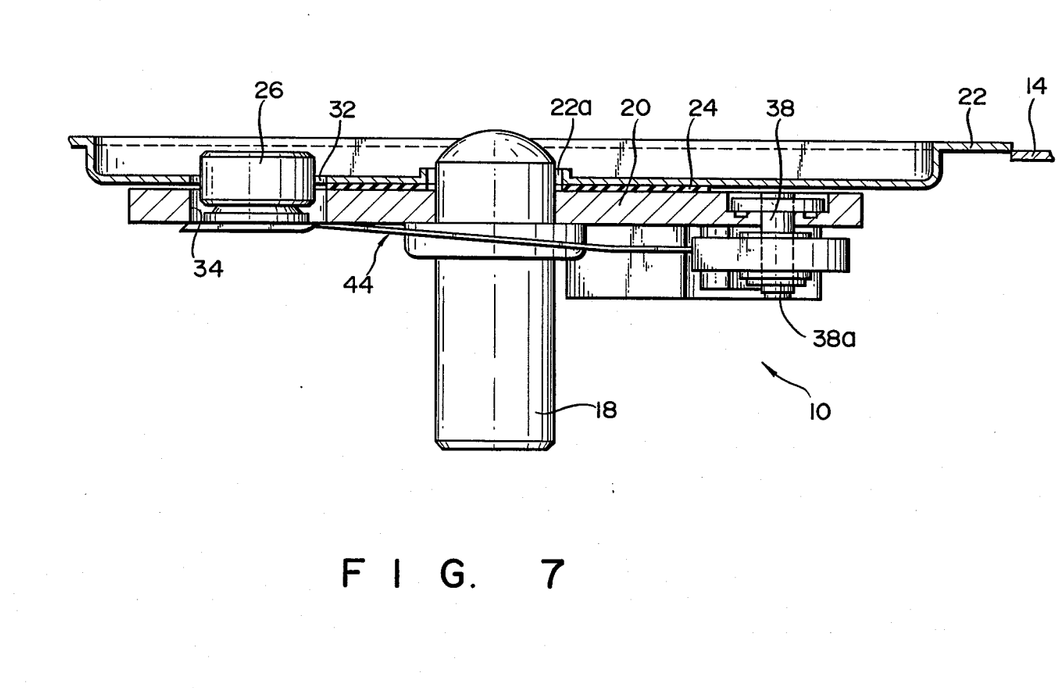
FIG. 7 is a sectional view illustrating the principal component of a second embodiment of a disk rotating apparatus according to the present invention.
Figure 8:
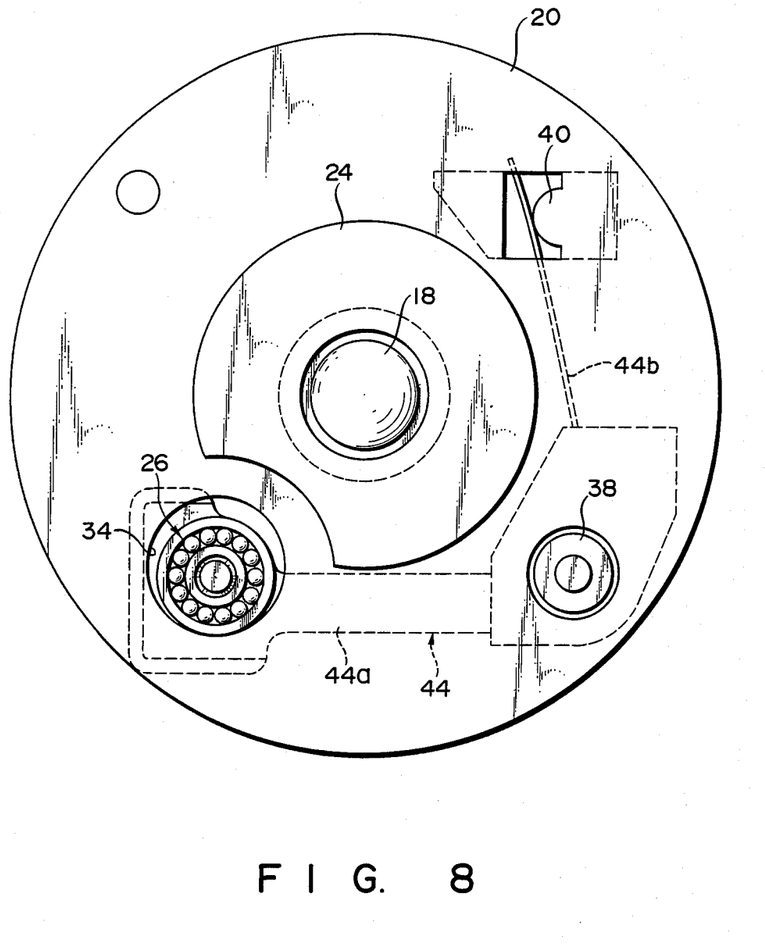
FIG. 8 is a top view illustrating a spring arm in a state mounted on a rotating disk member.

As shown in FIG. 5 and in FIGS. 6A through 6C, the spring arm 36 is formed into a generally L-shaped configuration from a single flat leaf spring by means of press molding. The spring arm 36 is attached so as to be freely rotatable through a prescribed angle on the other side of the rotating disk member 20, namely on the side thereof opposite that facing the disk hub 22 of the magnetic disk 14.

More specifically, the L-shaped bent portion of the spring arm 36 is formed to be horizontal. As shown in FIG. 6B, this horizonal portion is formed by punching to include a circular hole 36a through which a rotational support shaft 38 of as journal means is passed. Upon being passed through the hole 36a, the rotational support shaft 38 is implanted in a downwardly pointed attitude in the underside of the rotating disk member 20 at a position eccentric with respect to the center of rotation.

The lower end of the rotational support shaft 38 is formed to include an outwardly directed flange 38a by virtue of which the spring arm 36 is prevented from falling off the rotational support shaft 38.

The spring arm 36 has a first spring portion 36b extending in a horizontal plane and constituting a horizontal leaf spring portion. The drive pin 26 is fixedly secured to the distal end of the first spring portion 36b, which is formed from a leaf spring in such a manner as to have an urging force that biases the drive pin 26 into the oblong hole 34. That is, the spring arm 36 is attached to the rotating disk member 20 so as to be freely rotatable back and forth about the rotational support shaft 38 within a range equal to the length of the oblong hole 38 in a state where the drive pin 26 is loosely inserted into the oblong hole 34.

The spring arm 36 further has a second spring portion 36c extending generally at right angles from the end of the first spring portion on the journalled side thereof, as best seen in FIG. 6B, and upstands from the first spring portion 36b, as best seen in FIG. 6C. Thus, the second spring portion 36c forms a vertical leaf spring portion, which is formed from a leaf spring in such a manner as to have an urging force that biases the drive pin 26 into resilient contact with end face of the oblong hole 34.

A stopper pin 40 serving as a spring contact member is fixedly secured on the other side of the rotating disk member 20 at a position eccentric with respect to the center of rotation, at which position the stopper pin 40 will be engaged by the second spring portion 36c of the spring arm 36 attached to the rotating disk member 20. Owing to this engagement between the stopper pin 40 and the second spring portion 36c, the latter is elastically deformed to charge up the urging force that biases the drive pin 26 horizontally in a prescribed direction.

The operation of the apparatus 10 for rotating the magnetic disk 14 will now be described conjointly with the operation of the magnetic disk 14.

When the floppy disk assembly 12 is inserted into the word processor housing through a loading opening, not shown, the magnetic disk 14 accommodated within the hard case 28 is positioned directly above the rotating apparatus 10. The rubber magnet 24 on the top side of the rotating disk member 20 attracts the metallic disk hub 22 by magnetic force, and the upper end of the spindle shaft 18 is passed through the central hole 22a of the disk hub 22, thereby determining the position of the center of rotation.

Starting the driving motor 16 causes the spindle shaft 18 to rotate, thereby corotating the rotating disk member 20 fixedly secured to the spindle shaft 18 and the spring arm 36 attached to the rotating disk member 20. As described above in connection with the prior art using FIGS. 1A through 1C, the rotation of the above components causes the drive pin 26 attached to the spring arm 36 to be inserted into and to engage the drive hole 32 of the disk hub 22.

Figure 3B:
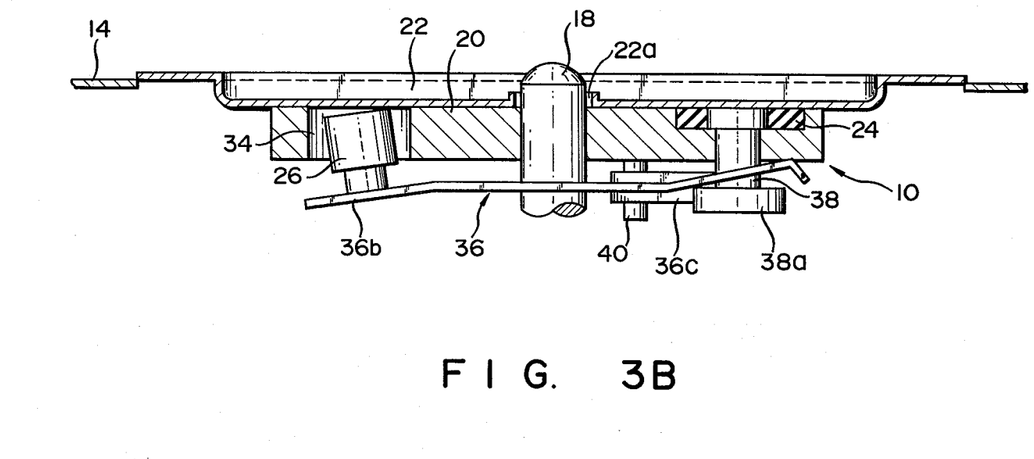
FIG. 3B is a sectional view showing the rotating apparatus of FIG. 1 in a state prior to chucking of a magnetic floppy disk in the apparatus.

In the state shown in FIG. 1A, the drive pin 26 abuts against the underside of the disk hub 22, as a result of which the drive pin 26 is pushed downwardly, as shown in FIG. 3B, against the urging force of the first spring portion 36b of spring arm 36. With the drive pin 26 in this depressed state, the spring arm 36 in this first embodiment of the invention is composed solely of the horizontally extending first spring portion 36b, which extends from the rotational support shaft 38 to the end at which the drive pin 26 is attached. As a result, the drive pin 26 is pushed downwardly in an excellent manner without twisting of the spring arm 36.

Thus, in accordance with the first embodiment, when the drive pin 26 comes to a position opposing the drive hole 32 owing to rotation of the spindle shaft 18, as shown in FIG. 3B, the drive pin 26 is inserted into the drive hole 32 in excellent fashion, and the inserting operation is executed in a reliable manner, since a twisting phenomenon does not occur.

As the spindle shaft 18 rotates further so that there is a transition from the state depicted in FIG. 1B to the state shown in FIG. 1C, the drive pin 26 supported on the spring arm 36 rotating together with the rotating disk member 20 comes to occupy a position at a corner portion of the drive hole 32 in disk hub 22. This corner portion is at the end of the drive hole 32 in the direction of rotation and is on the side of the drive hole closer to the outer side of the disk hub. The drive pin 26 rotates about the spindle shaft 18 while in the above-described position. Meanwhile, owing to this rotation, the spindle shaft 18 is in pressing contact with a specific corner portion of the square central hole 22a. As a result, the magnetic disk 14 is held at an appropriate position with respect to the spindle shaft 18.

If the drive pin 26 should happen to shift in the X direction in FIG. 1C due to e.g. a fluctuation in load torque when the disk is being driven, the spring arm 36 is supported by the rotational support shaft 38 and is resiliently urged in a direction opposite the X direction by the elastic force of its own vertical spring portion 36b. The spring arm 36 consequently turns a minute amount and without effort about the rotational support shaft 38, so that the drive pin 26 is caused to contact and follow up the prescribed region of the drive hole 32.

Thus, the magnetic disk 14 chucked at the appropriate position may undergo a writing or reading operation by having each track thereof contacted by a magnetic head, not shown, when the disk is being rotated.

At the time of this operation, the horizontal leaf spring portion 36b of the spring arm 36 is supported and a horizontal biasing force is applied by the vertical leaf spring portion 36c, so that the spring arm 36 does not apply a twisting force to the drive pin 26. Accordingly, the drive pin 26 does not shift upwardly or downwardly from the prescribed position, so that there is no risk of a deterioration in rotating reliability.

Thus, in accordance with the first embodiment, there is no risk of a decline in the positioning accuracy of the rotating disk member 20 with respect to the disk hub 22. Further, in accordance with the first embodiment, the spring arm 36 is composed of a single part. This facilitates assembly.

In addition, even if the drive pin 26 is subjected to an excessive force opposing the horizontal biasing force when the magnetic disk 14 is initially loaded or at the time of assembly and inspection, the spring arm 36 is so attached as to be rotatable back and forth about the rotational support shaft 38, thus allowing the spring arm 36 to rotate so that the aforementioned excessive force is dissipated. Accordingly, the spring arm 36 will not be deformed and, hence, no problems will arise, even if the spring arm is subjected to unnecessary forces.

The present invention is not limited to the arrangement of the first embodiment described above and can be modified in various way without departing from the gist of the invention.

Various embodiments of the present invention will now be described. Portions similar to those described in the first embodiment are designated by like reference characters and will not be described again.

It has been described in the first embodiment that the spring arm 36 is formed from a flat spring plate by pressing, that the horizontal spring portion 36b is constructed so as to be substantially planar, and that the hole 36a is formed by punching work, by way of example. However, the present invention is not limited to such an arrangement and can be arranged in the form of a second embodiment illustrated in FIGS. 7 through 9B.

Specifically, the construction of the spring arm in the second embodiment differs from that in the first embodiment. As shown in FIGS. 7 through 9B, the spring arm, which is designated at numeral 44 in the second embodiment, is formed to have a generally L-shaped configuration, as in the first embodiment. One piece of the spring arm 44 is composed of a horizontal spring portion 44a, which extends in a horizontal plane, so as to produce an urging force that inserts the drive pin 26 into the oblong hole 34. The other piece of the spring arm 44 is composed of a vertical spring portion 44b, which extends in a vertical plane, so as to produce an urging force that urges the drive pin 26 into resilient contact with the end face of the oblong hole 34. A hole 44c is formed at the central portion of this substantially L-shaped spring arm 44.

Figure 9A:
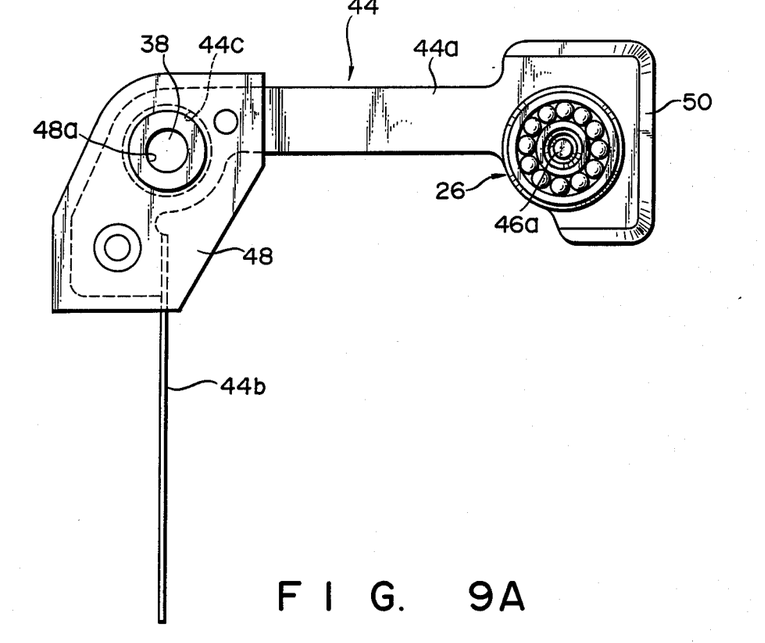
FIGS. 9A and 9B are top and front views, respectively, illustrating the construction of the spring arm of the second embodiment.
Figure 9B:
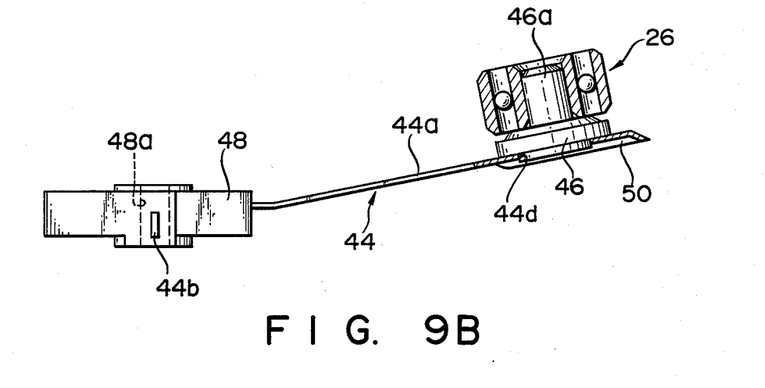

The drive pin 26 is supported at the distal end of the horizontal spring portion 44a of spring arm 44. Specifically, as shown in FIG. 9B, a mounting hole 44d is formed in the distal end of the horizontal spring portion 44a, and an axial support member 46 is fixedly secured to this distal end upon being fitted into the hole 44d. The drive pin 26 is freely rotatably mounted on the outer periphery of a support shaft 46a of this axial support member 46. In the second embodiment of the invention, the drive pin 26 comprises a bearing member.

A holding member 48 consisting of a self-lubricating resin such as polyacetal is fixedly secured to the central portion of the spring arm 44 in a state integrally molded thereto. The holding member 48 is so molded as to have a prescribed thickness and is formed to include a through-hole 48a in a portion thereof corresponding to the aforementioned hole 44c. The through-hole 48a slidingly contacts and supports the rotational support shaft 38 (shown in FIG. 7), which is implanted in the rotating disk member 20, in such a manner that the shaft 38 is free to rotate. In other words, the rotational support shaft 38, while received in the through-hole 48a of the holding member 48, supports the spring arm 44 in such a manner that the spring arm 44 is free to turn back and forth through a prescribed angle of rotation.

As in the first embodiment described above, the spring arm 44 is punched from a flat, leaf spring member, not shown, into the prescribed shape in a state having the holes 44c, 44d. Thereafter, the body punched from the leaf spring member is subjected to bending work to form the vertical spring portion 44b. Before the bending work, a downturned bent edge 50 is formed, by pressing work, on the horizontal spring portion 44a at the location where it contacts the rotating disk member 20, namely on the edge of the spring portion 44a at the part where the drive pin 26 is attached, as illustrated in FIGS. 9A and 9B. That is, the edge at one end of the horizontal spring portion 44a on which the drive pin 26 is attached is designed to have a generally bracket-shaped cross section by being integrally provided with the bent edge 50.

The operation that characterizes the disk rotating apparatus 10 according to the second embodiment having the spring arm 44 constructed as set forth above will now be described.

As in the first embodiment, when the drive pin 26 comes to a position opposing the drive hole 32 owing to rotation of the spindle shaft 18, as shown in FIG. 1B, the drive pin 26 is inserted into the drive hole 32 in excellent fashion, and the inserting operation is executed in a reliable manner, since a twisting phenomenon does not occur.

A reaction force from the magnetic disk 14 acts upon the distal end of the horizontal spring portion 44a supporting the drive pin 26, which is in abutting contact with the edge of the drive hole 32. However, as described above, the bent edge 50 is integrally formed on the periphery of the horizontal spring portion 44a at the part thereof having the drive pin 26 attached thereto. Consequently, this part of the spring portion 44a has an enlarged geometrical moment of inertia, whereby the supporting strength of this part is increased. Accordingly, there is no risk of the drive pin 26 being tilted unnecessarily to detract from the reliability with which the disk is rotatively driven.

When the driving state shown in FIG. 1C prevails, or when the drive pin is in the downwardly pressed state, as described above in connection with FIG. 1A, the mechanical strength of the peripheral part of the horizontal spring portion 44a to which the drive pin 26 is attached is raised by the bent edge 50. Thus, there is no risk of the horizontal spring portion 44a undergoing deformation.

Furthermore, since the bent edge 50 extends in a direction away from the rotating disk member 20, any burrs which may have been formed on the distal end of the horizontal spring portion 44a of the spring arm 44 supporting the drive pin 26, namely on the punched end face where contact is made with the rotating disk plate 20, will not contact the surface of the rotating disk member 20. As a result, wear resistance is improved and there is no deterioration, as might otherwise be caused by burrs touching the rotating disk member 20, in the ability of the drive pin 26 to contact and follow up the edge of the drive hole 32.

In addition, the rotational support shaft 38 supports the spring arm 44 via the through-hole 48a formed in the holding member 48 having the prescribed thickness. This enables the spring arm to undergo minute rotation smoothly without binding.

Moreover, the portion of the spring arm 44 where the horizontal spring portion 44a and vertical spring portion 44b are interconnected is molded into a unitary body with the holding member 48. Consequently, the arrangement is such that the horizontal spring portion 44a and vertical spring portion 44b project from the holding member 48. Therefore, even when the horizontal and vertical spring portions 44a, 44b are elastically deformed in different directions in order to charge up an urging force in these portions, an excessive force does not act upon the joint between the horizontal and vertical spring portions 44a, 44b, and overall twisting of the spring arm 44 does not occur. In addition, fatigue stress does not develop at the joint, thus assuring that the spring member 44 will have a long service life.

Thus, when the magnetic disk 14 rotated while chucked at the appropriate position undergoes a writing or reading operation, the drive pin 26 will not shift upwardly or downwardly from the prescribed position to detract from the reliability with which the disk is rotated. This assures a highly reliable write/read operation.

Figure 10A:
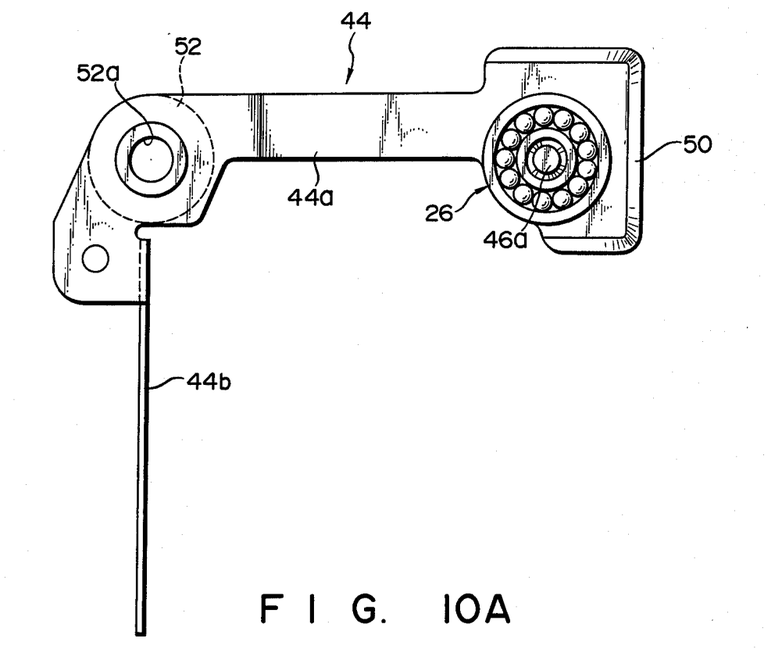
Figure 10B:
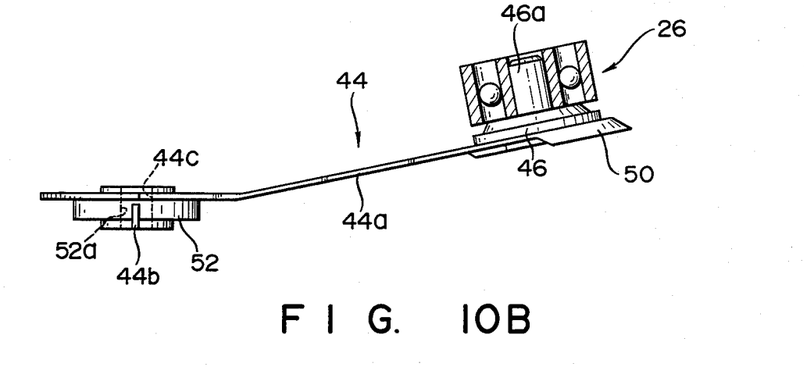

In the second embodiment of the invention set forth above, it is described that the holding member 48 is formed from a self-lubricating synthetic resin and has a prescribed thickness. However, the second embodiment is not limited to this arrangement. In a first modification of the second embodiment, as shown in FIGS. 10A and 10B, the holding member, here designated at numeral 52, can be formed to a prescribed thickness from a metal such as a bearing copper alloy, with a hole 52a being formed at the center of the holding member. In this case, the holding member 52 is fixedly secured by caulking via the hole 44c formed in the central portion of the spring arm 44.

Figure 11A:
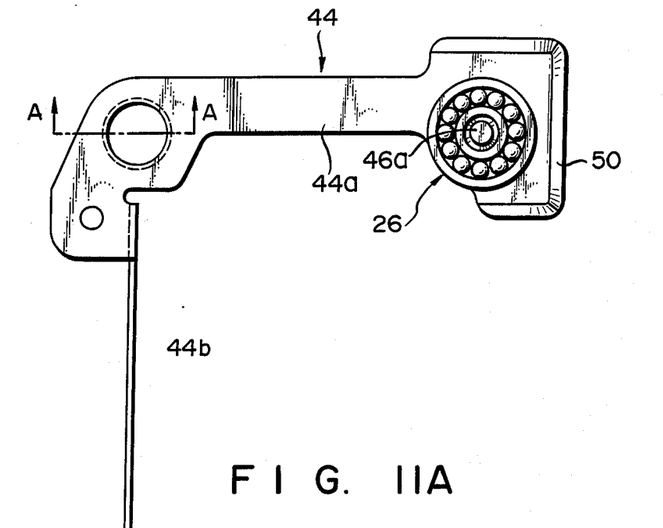
FIGS. 11A, 11B and 11C are top, front and sectional views, respectively, illustrating the construction of the spring arm in a second modification of the second embodiment.
Figure 11B:
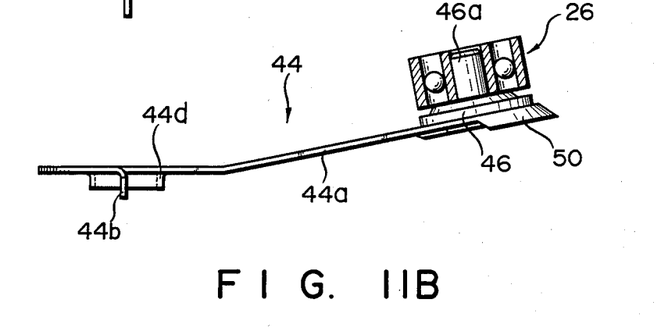
Figure 11C:
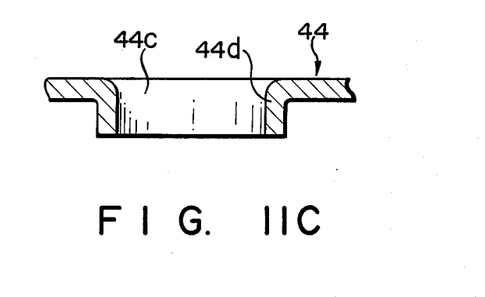

Further, in the second embodiment of the present invention, holding member 48, 52 is employed in order to attain the prescribed thickness for the hole through which the rotational support shaft 38 is inserted. However, the second embodiment is not limited to this arrangement. In a second modification of the second embodiment, as shown in FIGS. 11A through 11C, the horizontal spring portion 44a includes a cylindrical portion 44d integrall formed to the inner peripheal edge of the hole 44C by buring process. Thus, the cylindrical portion 44d has the prescribed thickness. In this second modification, the holding member 48, 52 is not necessary, therefore, forming process for forming the spring arm 44 is simplified.

What is claimed is:

1. A disk rotating apparatus for rotating a magnetic disk supported by a disk hub on its central portion, said disk hub having a central hole coaxial with a central axis thereof and a drive hole eccentric with respect to the central axis, said disk rotating apparatus comprising:
   a driving motor;
   a spindle shaft rotated by said driving motor and inserted through the central hole of the magnetic disk;
   a rotating member fixed to said spindle shaft in coaxial relation therewith and rotated together with said spindle shaft;
   a drive pin arranged on said rotating member eccentric with respect to the central axis thereof and capable of being inserted through the drive hole of the magnetic disk;
   a leaf spring member attached to the underside of said rotating member, said leaf spring member including a first leaf spring portion having said drive pin implanted in one end thereof, and a second leaf spring portion bent at a right angle from the other end of said first leaf spring portion;
   journal means for rotatably supporting said leaf spring member, at said other end of said first leaf spring portion, on said rotating member about an axis perpendicular to the underside of said rotating member; and
   a spring contact member fixed to the underside of said rotating member eccentric with respect to the central axis thereof;
   said second leaf spring portion contacting said spring contact member to apply an urging force for biasing said drive pin into resilient contact with a side edge of the drive..hole, and said first leaf spring portion applying an urging force for biasing said drive pin resiliently to insert the same into the drive hole.

2. The disk rotating apparatus according to claim 1, wherein said magnetic disk is set so as to be rotated about a vertical axis;

the first leaf spring portion of said leaf spring member extends in the horizontal direction; and the second leaf spring portion of said leaf spring member extends in the vertical direction.

3. The disk rotating apparatus according to claim 1, wherein said journal means has a rotational support shaft fixedly secured to the underside of said rotating member in a state upstanding therefrom;

the other end of said first leaf spring portion has a hole into which said rotational support shaft is directly and slidably fitted; and said leaf spring member is freely rotatably supported about the rotational support shaft by being slidably fitted thereon.

4. The disk rotating apparatus according to claim 1, wherein said journal means includes:

a rotational support shaft fixedly secured to the underside of said rotating member in a state upstanding therefrom, said rotational support shaft being loosely inserted into an insertion hole formed in the other end of said first leaf spring portion; and a holding member of a prescribed thickness integrally attached to said leaf spring member in a state embracing the other end of said first leaf spring portion, said holding member having a through-hole communicating with said insertion hole and into which said rotational support shaft is directly inserted.

5. The disk rotating apparatus according to claim 4, wherein said holding member is formed from a synthetic resin and is integrally molded on said leaf spring member to embrace the other end of said first leaf spring portion and a part of said second leaf spring portion.

6. The disk rotating apparatus according to claim 4, wherein said holding member comprises a bearing made of metal.

7. The disk rotating apparatus according to claim 1, wherein the periphery of a part of said first leaf spring portion contacted by a part of said rotating member in the vicinity of the through-hole thereof has a projecting edge extending in a direction away from the underside of said rotating member.

* * * * *